United States Patent [19]

Mossman

[11] Patent Number: 5,378,102
[45] Date of Patent: Jan. 3, 1995

[54] BARREL ASSEMBLY AND COMPOSITE STRESS PLATE

[75] Inventor: Jeffrey L. Mossman, Olmsted Falls, Ohio

[73] Assignee: SFS Stadler, Inc., Reading, Pa.

[21] Appl. No.: 768,035

[22] Filed: Sep. 30, 1991

[51] Int. Cl.⁶ ............................................. F16B 43/00
[52] U.S. Cl. ...................................... 411/531; 411/160; 411/533; 81/57.37; 52/410; 227/140
[58] Field of Search .................. 52/410, 512; 411/160, 411/161, 368, 531, 533, 542; 81/54, 57.37, 431, 435; 227/111, 112, 119, 120, 136, 140

[56] References Cited

U.S. PATENT DOCUMENTS

| | | | |
|---|---|---|---|
| 2,274,010 | 2/1942 | Stellin | 411/161 |
| 3,258,042 | 6/1966 | Ruminsky | 81/431 |
| 4,074,501 | 2/1978 | Sandqvist | 52/741 |
| 4,361,997 | 12/1982 | DeCaro | 52/512 |
| 4,445,306 | 5/1984 | Schauffele | 52/410 |
| 4,520,606 | 6/1985 | Francovitch | 52/410 |
| 4,569,259 | 2/1986 | Rubin et al. | 81/176.15 X |
| 4,630,984 | 12/1986 | Reinwall et al. | 411/368 |
| 4,631,433 | 12/1986 | Stokes | 411/531 X |
| 4,658,558 | 4/1987 | Verble | 52/410 |
| 4,663,910 | 5/1987 | Hasan | 52/410 |
| 4,712,959 | 12/1987 | Hasan | 411/533 |
| 4,726,164 | 2/1988 | Reinwall et al. | 52/410 |
| 4,727,699 | 3/1988 | Sargent | 52/410 |
| 4,744,187 | 5/1988 | Tripp | 52/410 |
| 4,747,241 | 5/1988 | Whitman | 52/410 X |
| 4,757,661 | 7/1988 | Hasan | 52/410 |
| 4,763,456 | 8/1988 | Giannuzzi | 52/410 |
| 4,777,775 | 10/1988 | Verble | 52/410 |
| 4,777,851 | 10/1988 | Gubitose | 81/57.37 |
| 4,780,039 | 10/1988 | Hartman | 411/531 |
| 4,781,503 | 11/1988 | Bogel | 411/368 |
| 4,787,188 | 11/1988 | Murphy | 52/410 |
| 4,788,807 | 12/1988 | Whitman | 52/410 |
| 4,803,823 | 2/1989 | Stenson | 52/506 |
| 4,809,568 | 3/1989 | DeCaro | 81/57.37 |
| 4,856,951 | 8/1989 | Blucher et al. | 411/178 |
| 4,884,932 | 12/1989 | Meyer | 52/410 X |
| 4,907,927 | 3/1990 | Choiniere | 411/368 |
| 4,987,714 | 1/1991 | Lemke | 52/410 |
| 5,035,028 | 7/1991 | Lemke | 24/336 |
| 5,049,014 | 9/1991 | Lemke | 411/55 |
| 5,058,464 | 10/1991 | McGovern et al. | 81/435 X |
| 5,102,275 | 4/1992 | Hulsey | 52/410 X |

FOREIGN PATENT DOCUMENTS

| | | | |
|---|---|---|---|
| 39510 | 11/1931 | France | 411/160 |

OTHER PUBLICATIONS

"Olympic Fasteners" by Olympic Manufacturing Group, Inc.; (5 pages).

*Primary Examiner*—Peter M. Cuomo
*Assistant Examiner*—Suzanne L. Dino
*Attorney, Agent, or Firm*—Helfgott & Karas

[57] ABSTRACT

A composite stress plate for securing insulation to a roof deck with a fastener includes a metal plate having a drawn central cup with a concentric aperture and a plastic insert having a central throughbore for receiving the fastener in a threaded manner. The plastic insert may have a hub which corresponds in shape to and is adapted to snappingly engage the concentric aperture in the metal plate, or the insert may be received by the cup in the metal plate and retained therein. Means for preventing relative rotation between the plastic insert and the metal plate are provided in either case. A plurality of depressed ramps are disposed within the plate having cleats for engaging the insulation. The ramps enhance alignment of the composite stress plate on a barrel assembly of an installation tool and precise placement of the threaded fastener into the roof deck is achieved. The barrel assembly has a plate retaining member having an engagement face with a plurality of locator projections extending downwardly therefrom. The locator projections may include three metal studs for insertion into the ramps. The locator projections engage the plate at three contact points to hold the stress plate against rotation while the fastener is being threaded through the plastic insert and into the roof deck by the installation tool.

20 Claims, 3 Drawing Sheets

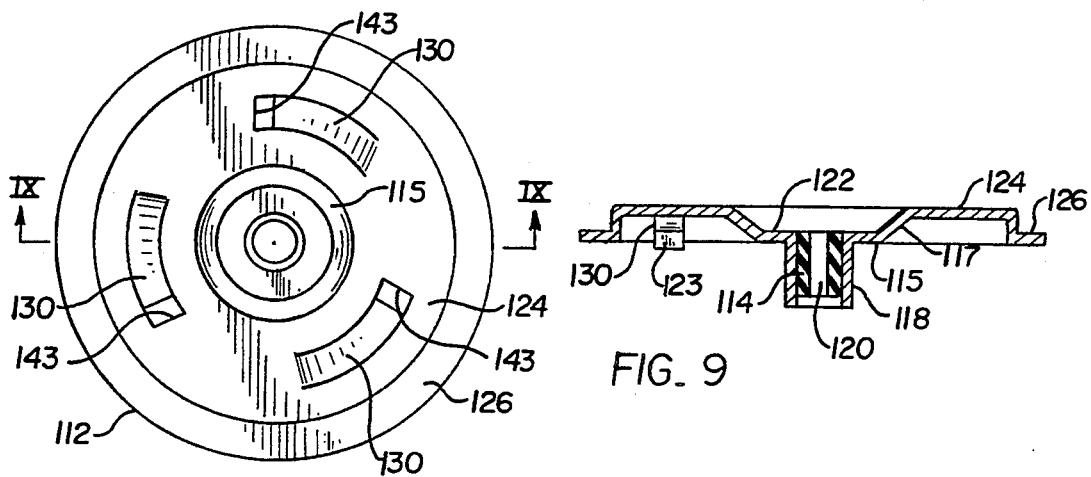
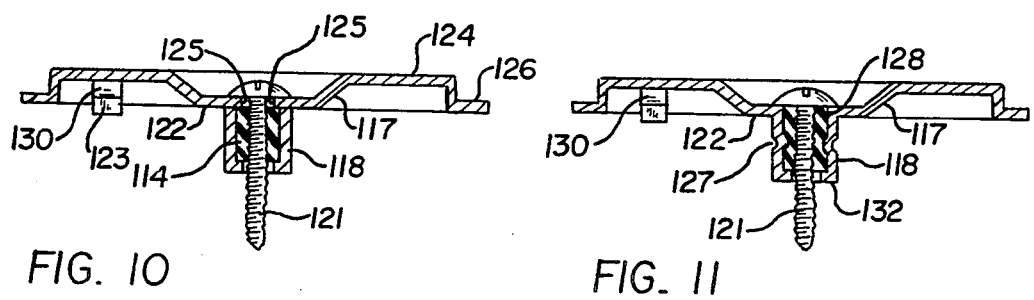
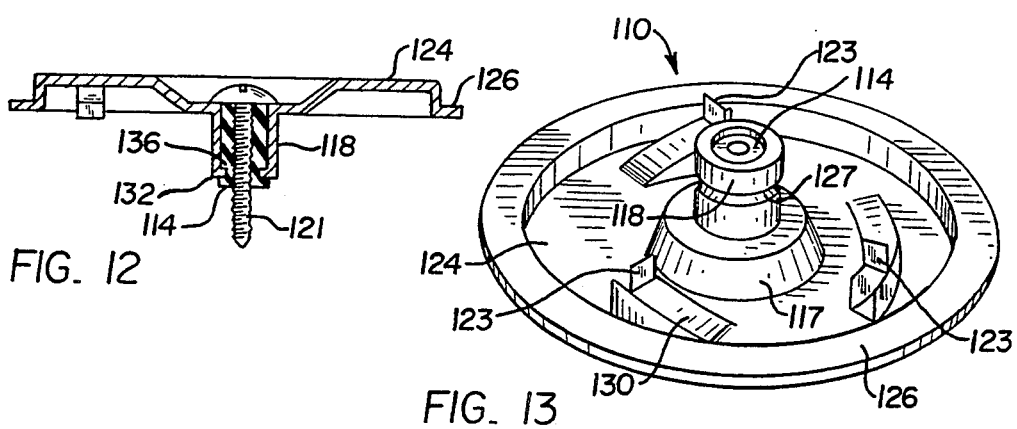

BARREL ASSEMBLY AND COMPOSITE STRESS PLATE

BACKGROUND

1. Field of the Invention

This invention relates to fastener assemblies and, more particularly, to such assemblies which are used to secure insulation and membrane to a building structure.

2. Description of the Prior Art

When roofing is installed on commercial buildings, a layer of insulation is normally secured to the roof deck. The assemblies which are used to secure the insulation generally comprise a washer-like stress plate made of either plastic or metal which receives a screw-like fastener that is threaded into the roof deck, clamping the insulation between the stress plate and the roof deck. Since insulation utilized is commonly up to six inches thick, while special applications can exceed twelve inches, it is important to keep the fastener in perpendicular alignment when installing the plate so that the stress plate properly contacts the roof deck. To facilitate this alignment, the plate and fastener are commonly installed using an installation tool, such as that described in U.S. Pat. No. 4,809,568.

An additional problem with the stress plate, screw, insulation, and roof deck assembly is vibration causing the fastener to back out of the stress plate. This will allow loss of the clamp load on the insulation which could result in destruction of the roofing system. Another problem with screw back-out is the possibility of the screw head penetrating the waterproofing membrane of the roofing system allowing water to enter the roofing system. This problem has been addressed by locking and alignment devices in plastic stress plates: see U.S. Pat. No. 4,361,997.

Plates utilized in the past to secure insulation have generally been made solely of either metal or plastic. While plastic stress plates have the advantage of using the above-noted locking and alignment devices, they may not have the advantages of steel stress plates in several applications. In roofing membrane applications where propane fueled torches are used, there may be occasions where, if done improperly, a plastic stress plate which is commonly made of polypropylene or polyethylene could reach a temperature where the clamp load on the insulation between the stress plate and metal deck could partially release. Polymer materials are available that would prevent this; however, their cost is prohibitive to use on the total stress plate. An ideal composite stress plate would enable an inexpensive coated steel to be used for the majority of the stress plate with only the central hub produced from the high performance polymer.

In some applications, all-plastic plates have been found inadequate for providing peripheral support to the insulation around the point of attachment of the plate due to the fact that the outwardly extending portion of the plate is not as rigid as that of its all-metal counterpart. Thus, all-plastic plates have frequently been designed with corrugated ribs, etc. to strengthen rigidity. See, for instance, U.S. Pat. Nos. 4,520,606 and 4,726,164. The necessity of adding sufficiently sized ribs to the plastic plate structure could increase fabrication costs and thus threaten to reduce demand in the construction industry for all-plastic plates. With a composite stress plate, an inexpensive coated metal stamping could be used for the required peripheral support while allowing a plastic insert for the advantages of alignment and head retention.

As mentioned above, alignment of the fastener and the plate during installation is important as insulation thickness frequently requires use of screws up to seven inches long, and over twelve inches long in special applications. Thus, it is desirable to stabilize the plate on the installation tool in proper alignment with the fastener. It is also desirable to prevent relative rotation of the plate on the tool during installation as this frequently causes misalignment of the fastener.

Recently, others in the art have utilized composite two-plate structure to secure insulation to roof deck. U.S. Pat. No. 4,757,661 discloses a washer with axial ribs for attaching insulation to a roof member. The fourth embodiment of this invention is comprised of two components, a central body and a flange, and they are shown as being made of two different materials, plastic and metal. Antirotational means are also disclosed, but the problem of fastener and plate alignment is not addressed.

Therefore, it is an object of the present invention to provide a plate for securing insulation to a roof deck which incorporates the advantages of plastic and metal construction in one composite structure, minimizing the disadvantages associated with such plates which are all-metal or all-plastic. Additionally, it is an object of the present invention to improve alignment of the fastener when installing the washer-like plate and to insure that the clamp load of the fastener on the plate is maintained throughout the life of the roof structure. Finally, it is an object of the invention to prevent rotation of the plate on the installation tool when the threaded fastener is being installed, and to prevent relative rotation between the plastic insert and the metal stress plate.

SUMMARY OF THE INVENTION

Accordingly, I have invented a composite stress plate ("composite") for securing insulation with or without a membrane to a roof deck with a threaded fastener, which offers the advantages of plastic and metal in a unitary structure. The composite comprises a metal plate having a drawn central cup with a concentric aperture, along with a plastic insert having a central throughbore for receiving the fastener in an interference-fit relationship. The plastic insert is adapted to engage the drawn cup, thus forming the composite. The composite further includes means for preventing relative rotation between the plastic insert and the metal plate when the plastic insert is engaged in the cup.

The metal plate has an elevated portion, a bottom surface and a rim with a bearing flat located within the cup. The plate includes at least one recess for engaging a locator projection on a barrel assembly of an installation tool, and the recess has a depending cleat extending below the plane of the rim and the bearing flat for engaging the insulation. The recess may include a depressed ramp which extends from the elevated portion downward in a counterclockwise fashion, with the cleat depending from a lower edge of the ramp.

The plastic insert in a first embodiment has a head, a downwardly protruding hub, and a central throughbore for receiving the fastener in an interference-fit relationship. The hub is shaped to mate with an angular aperture in the metal plate to prevent relative rotation between the plastic insert and the metal plate when the fastener is threaded into the plastic insert. At least one tab depends from the hub and engages the bottom surface of the cup on the metal plate thereby fixing the hub in engagement with the angular aperture and forming the composite.

In a second embodiment, the plastic insert is completely received by the drawn central cup. The metal plate has a crimp which extends into the cup and engages the plastic insert, thus preventing relative rotation between the plastic insert and the metal plate. The crimp may be at the upper lip of the cup (thus comprising a "stake"), in the walls of the cup, or at the lower lip of the cup. The plastic insert and the cup may be substantially congruent in a shape which prevents relative rotation between the plastic insert and the metal plate.

The barrel assembly on the installation tool has a plate retaining member with an engagement face thereon. One or more locator studs extend downwardly from the engagement face and are equally spaced about a central axis of the barrel assembly. After the composite and fastener are pre-assembled and placed on the insulation, the barrel assembly is placed over the composite and the installation tool begins rotating the fastener to place it into the roof deck. The engagement face engages the metal plate and each locator stud is inserted into a corresponding depressed ramp. Each metal stud engages a contact point on the metal plate to prevent rotation of the composite. A peripheral rib on the plate retaining member engages the rim on the plate to further align the fastener and the composite for proper installation.

Other features and advantages of the present invention will become apparent from the following detailed description in conjunction with the accompanying drawings.

BRIEF DESCRIPTION OF THE DRAWINGS

FIG. 8 is a plan view of a metal plate in accordance with a second embodiment of the invention;

FIG. 9 is a sectional view taken along lines IX—IX of FIG. 8;

FIG. 10 is a sectional view of a first variant of the second embodiment of the invention;

FIG. 11 is a sectional view of a second variant of the second embodiment of the invention;

FIG. 12 is a sectional view of a third variant of the second embodiment of the invention;

FIG. 13 is a bottom perspective view of the composite metal plate and plastic insert of FIG. 11, excluding the fastener;

DETAILED DESCRIPTION OF THE PREFERRED EMBODIMENTS

Figure 7:
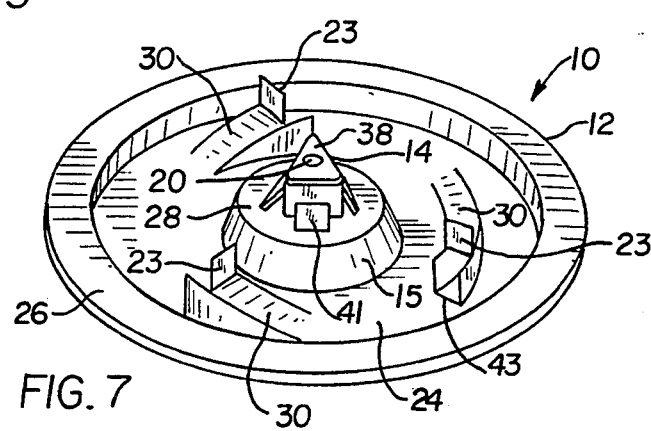
FIG. 7 is a bottom perspective view of the composite metal plate and plastic insert of FIG. 6, excluding the fastener.

A first embodiment 10 and a second embodiment 110 of the composite stress plate ("the composite") are shown in FIGS. 7 and 13, respectively. Each embodiment has a metal plate 12, 112 and a plastic insert 14, 114. Each of the metal plates 12, 112 has a drawn cup 15, 115 in the center of the metal plate. The plastic insert 14, 114 has a central throughbore 20, 120 for receiving a fastener 21, 121 in an "interference-fit" or, in other words, threaded manner. The threaded engagement may be seen in FIGS. 6 and 10–12. The plastic inserts 14, 114 engage the metal plates 12, 112 and, as discussed in further detail below, means are included for preventing relative rotation between the plastic insert and the metal plate when the two are engaged and the fastener is threaded into the plastic insert 14, 114.

Figure 1:
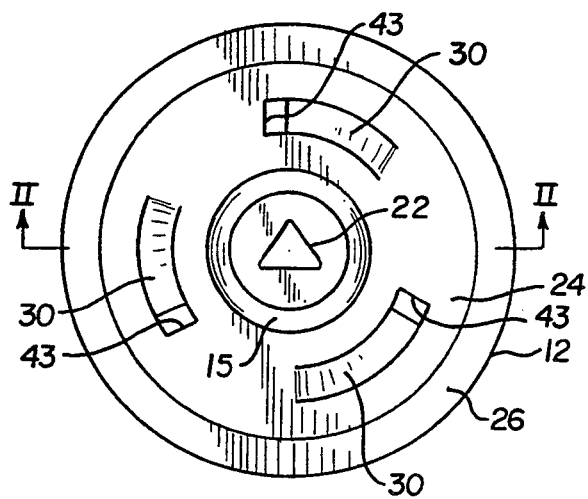
FIG. 1 is a plan view of a metal plate in accordance with a first embodiment of the invention.
Figure 2:
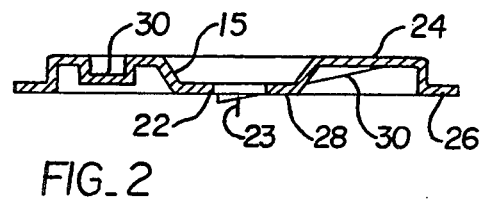
FIG. 2 is a section taken along lines II—II of FIG. 1.
Figure 3:
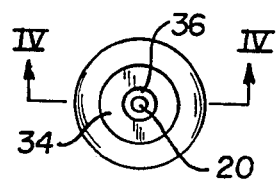
FIG. 3 is a plan view of a plastic insert in accordance with the first embodiment of the invention.
Figure 4:
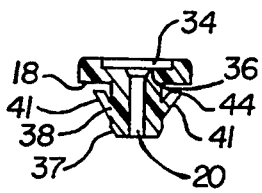
FIG. 4 is a sectional view taken along lines IV—IV of FIG. 3.
Figure 5:
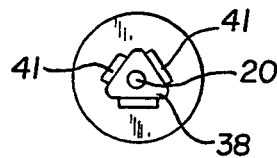
FIG. 5 is a bottom view of the plastic insert of FIG. 4.
Figure 6:
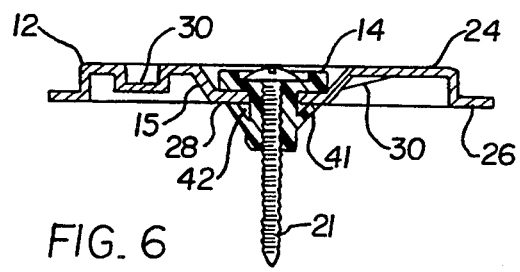
FIG. 6 is a sectional view showing the plastic insert of FIG. 3 engaged in the metal plate of FIG. 1.
Figure 14:
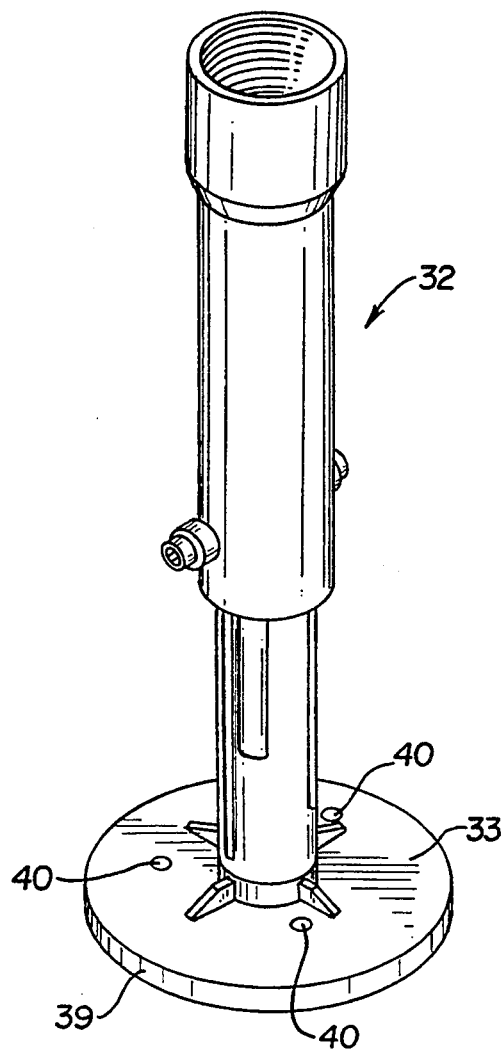
FIG. 14 is a perspective view of an installation tool barrel assembly according to the present invention.
Figure 16:
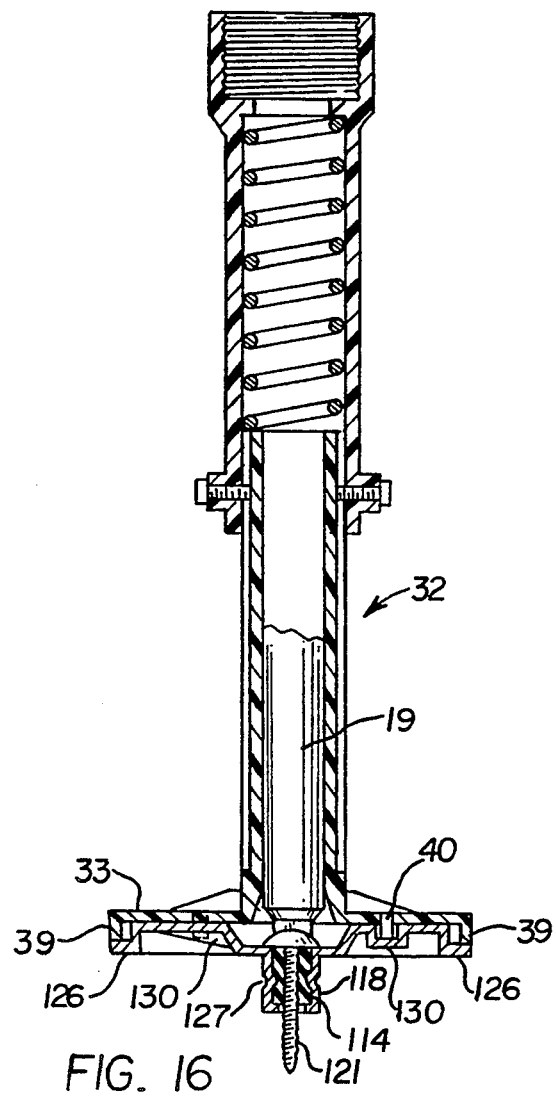
FIG. 16 is a sectional view of a combined barrel assembly and composite stress plate according to the present invention.
Figure 15:
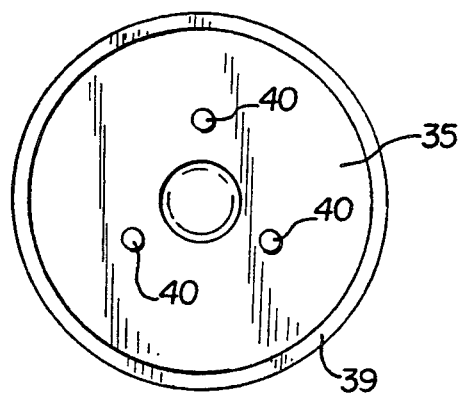
FIG. 15 is a bottom view of the barrel assembly of FIG. 14.

Referring generally to FIGS. 1–7, details of the first embodiment of the composite 10 are shown. FIG. 1 shows the metal plate 12 with the drawn cup 15 having a concentric angular aperture 22. As shown in FIG. 2, the plate 12 includes an elevated portion 24 and a rim 26 as well as a bottom surface 28. The angular aperture 22 and the rim 26 are coplanar in a plane below and parallel to the elevated portion 24. The angular aperture 22 may be of any noncircular shape, but it is preferably an equilateral triangle. A depressed ramp 30 is stamped at three locations in the elevated portion 24. The depressed ramps 30 extend from the elevated portion downward in a counterclockwise fashion, with a punched cleat 23 depending from a lower edge of each ramp 30. The cleat 23 extends below the plane of the angular aperture 22 and the rim 26 to engage the insulation. Each depressed ramp 30 is designed to receive a stud 40 on a barrel assembly 32 of an installation tool 19 as shown in FIGS. 14–16. The barrel assembly holds the composite 10, 110 in proper alignment while the fastener 21, 121 is secured to the roof deck, as further discussed below.

Referring now to FIGS. 3–6, the plastic insert 14 is shown with a countersink 34 and a lip 36 disposed in a head 18. The head 18 may be of various shapes but is preferably cylindrical, having an outer diameter greater than the outer dimension of a downwardly protruding hub 38 which depends from the head 18. These features allow the head of the fastener 21 to become flush with the head 18 of the plastic insert 14 when the fastener 21 is inserted in the central throughbore 20, thus providing a smooth upper surface on the composite 10, which is desirable when subsequent layers of roofing membrane or the like are to be placed on top of the insulation after securement to the roof deck. Additionally, the hub 38 may be provided with a bevel 37 which enhances insertability of the hub into the aperture 22.

The hub 38 is shaped to mate with the angular aperture 22 in the metal plate 12 in a manner which prevents relative rotation between the plastic insert 14 and the metal plate 12. Specifically, the hub 38 is congruent with the angular aperture 22 so that when the hub 38 is inserted into the angular aperture 22, rotational movement of the hub is impossible. Preferably, the hub is in the shape of an equilateral triangle, corresponding to the preferred angular aperture 22 discussed above.

Thus, relative rotation between the plastic insert 14 and the metal plate 12 is prevented.

The hub 38 may also include one or more tabs 41 which depend from the hub and engage the bottom surface 28 of the cup 15, thereby fixing the hub 38 in engagement with the angular aperture 22. Specifically, each tab 41 depends from a face 42 on the hub so that the free end of the tab 41 forms a bearing edge 44 which is radially spaced from the hub and which contacts the bottom surface 28 of the cup 15. The plastic construction of the tabs 41 allows for bending of the tabs when forced through the angular aperture 22, the tabs 41 snapping back into place when completely pushed through. The bearing edge 44, spaced away from the hub 38 and against the bottom surface 28 prevents back-out of the hub 38 from the angular aperture 22. The preferred embodiment has three tabs depending from the hub 38, each forming an acute angle with a corresponding face 42 of the hub 38, as shown in FIG. 7.

Referring to FIGS. 8–13, a second embodiment of the composite 110 is shown. Again, the composite 110 has a metal plate 112 and a plastic insert 114. The metal plate 112 has a cup 115 with a concave upper portion 117 and a cylindrical lower portion 118. The plastic insert 114 is fully received by lower portion 118, and the plastic insert 114 has a central throughbore 120 for receiving a fastener 121 in an interference-fit relationship. As discussed above in connection with the first embodiment, the lower portion 118 may be circular or may be of any noncircular shape, such as an equilateral triangle, to prevent relative rotation between the metal plate 112 and the plastic insert 114. The concave upper portion 117 provides a bearing flat 122 near an upper lip 128 of lower portion 118. The fastener head engages the bearing flat 122 to enhance the clamp load on composite 110, as long as the inner diameter of lower portion 118 is less than the outer diameter of the fastener head.

In order to prevent back-out of the plastic insert 114 from lower portion 118, a crimp is formed in the cup to engage the plastic insert 114. The crimp also serves to prevent relative rotation between the plastic insert 114 and metal plate 112. FIGS. 10–12 show three versions of the composite 110, each having a different crimp arrangement. In the first version, FIG. 10, a stake 125 is located at upper lip 128 and the stake extends radially into the cup a sufficient distance to capture the plastic insert 114 and prohibit the plastic insert from backing out of lower portion 118. The stake is folded on top of the plastic insert 114 after its insertion into lower portion 118. The bottom of the plastic insert 114 rests on a lower lip 132 of the cup which extends radially inward from the lower portion 118.

A second crimp arrangement is shown in FIG. 11. A crimp 127 is formed in the midsection of lower portion 118 and extends into the cup. The plastic insert 114 is thus constricted around its mid-section and held within the cup. Specifically, the plastic insert 114 is placed in an uncrimped lower portion 118 at rest on the lower lip 132. The crimp 127 is subsequently punched in the lower portion 118, forcing metal radially inward to the mid-section of the plastic insert 114.

Finally, a third crimp arrangement is shown in FIG. 12. The plastic insert 114 is positioned so that it partially extends below the lower lip 132 of the cup. The lower lip 132 is then driven radially inward, forming a recess 136 in which the lip 132 engages the plastic insert 114.

Referring to FIGS. 14–16, a barrel assembly used for installing the composite is shown. The barrel assembly 32 includes a plate retaining member 33 having an engagement face 35 with a peripheral rib 39. Three metal locator studs 40 extend downward from engagement face 35 and are equally spaced about a central axis of the barrel assembly 32. The studs 40 are integrally molded with the barrel assembly 32, and each stud is inserted into its corresponding depressed ramp 30 when the barrel assembly is placed over the composite 10, 110 and the fastener is threaded into the roof deck. Clockwise rotation of the composite 10, 110 caused by threading of the fastener 21, 121 through the central throughbore 20, 120 of the plastic insert 14, 114 is prevented by engagement of the studs 40 against three contact points 43, 143 on the elevated portion 24, 124 facilitated by the depressed ramps 30, 130. The studs engage the ramps 30, 130 "on-the-fly" as the tool and barrel assembly are pressed downward onto the composite. As the installation tool 19 rotates the fastener, the plate retaining member 35 is pressed down onto composite 10, 110. At the high degrees of torque necessary to place the threaded fastener into the roof deck, the composite may spin clockwise, despite engagement of the cleats 23 into the insulation. The studs 40 then proceed down ramps 30, 130 until engaging contact points 43, 143 on elevated portion 24, 124 of the metal plate 12, 112. The composite is thereby held against rotation relative to the barrel assembly and the insulation and the proper clamp load of the composite on the insulation may be established.

As an additional alignment feature, the peripheral rib 39 on the barrel assembly 32 engages the rim 26, 126 on the composite to insure proper horizontal placement of the metal plate 12, 112 and rim 26, 126 on the insulation or membrane. The rib 39 also serves to "capture" the composite and further restrict its movement to insure perpendicular alignment of the fastener within throughbore 20.

The first embodiment of the composite 10 has several advantages, namely: (1) the metal plate 12 provides maximum peripheral support of the insulation; (2) the central throughbore 20 in the plastic insert 14 is not subject to rusting at this critical point of connection between the fastener 21 and the composite 10 as is common in prior art all-metal plates; (3) the plastic insert 14 is removable from the metal plate 12 and thus the entire composite 10 need not be discarded should the central throughbore 20 become stripped during installation of the composite 10 with the fastener 21, rather the plastic insert 14 may be replaced; (4) the interference-fit relationship between the fastener 21 and the plastic insert 14 insures that a clamp load is maintained on the insulation throughout the useful life of the roof structure; and (5) the interference-fit prevents back-out of the fastener head from the plastic insert 14 due to various forces exerted on the roof structure. Additionally, the depressed ramps 30 enhance stability of the composite 10 during installation, and the studs 40 are received by the ramps 30 to engage contact points 43 and prevent relative rotation between the composite 10 and the installation tool. This promotes precise placement of the threaded fastener 21 into the roof deck and insures against relative rotation of the stress plate and the insulation, even at high degrees of torque necessary to apply the requisite clamp load. The depending cleats 23 engage the insulation to prevent it from creeping out from under the composite and they also prevent relative rotation between the composite and the insulation at low degrees of torque to establish the interference-fit of the fastener prior to engagement of the barrel assembly on the plate. Thus, the ramps 30 have a dual function which increases overall design efficiency for the composite.

A significant advantage of the second embodiment of the invention over the first embodiment is in manufacturing. Molds for the various plastic insert designs discussed can be cost prohibitive, especially when they include added features such as the downwardly protruding hub and the tabs. The plastic insert of the second embodiment excludes those features and may be simply cut in successive pieces from an extruded plastic tube of appropriate cross-sectional shape. This greatly reduces manufacturing time and cost for the composite while maintaining all the advantages of the more expensive embodiments. The plastic insert 14, 114 may be made of nylon copolymers, high density polyethylene, polypropylene or polyetherimide resins such as Ultem ® made by G. E. Plastics, Inc.

All embodiments of the composite may be used to secure insulation alone to roof deck, or to secure insulation in combination with an overlying membrane. In either case, the interference-fit of the fastener into the plastic insert prevents backing-out of the fastener from the composite in cases where the insulation is compressed, such as by walking on it, or when the composite is compressed by similar forces. When the invention is used to secure insulation alone, a larger diameter stress plate, for example, three inches, is used. When securing both membrane and insulation, a smaller stress plate may be used, for example, two inches in diameter.

The various means for preventing relative rotation between the plastic insert and the metal plate enable the interference-fit with the fastener to be established, and this means need not be limited to the structures disclosed herein.

Having described the presently preferred embodiments of the invention, it will be understood that this description is not intended to limit the scope of the invention except as set forth in the appended claims.

I claim:

1. In combination, a composite stress plate for securing a layer of insulation to a roof deck with a threaded fastener, and a barrel assembly for an installation tool operating to rotate said fastener by threading it into the composite stress plate, said barrel assembly having a plate retaining member at a distal end thereof, comprising:

a metal plate having a drawn central cup with a concentric aperture, and a rim;

a plastic insert having a central throughbore completely therethrough for receiving a threaded fastener therethrough in an interference-fit relationship, said plastic insert corresponding in shape to and engaging the cup in the metal plate and forming said composite stress plate therewith;

means for preventing relative rotation between the plastic insert and the metal plate when the plastic insert is engaged in the cup and the fastener threads engage the central throughbore;

said plate retaining member including an engagement face, at least one locator projection extending downwardly from said engagement face, and a peripheral rib; and at least one recessed ramp provided in said plate and terminating in a contact point, said locator projection being received in said recessed ramp as said barrel assembly is pressed down onto said composite stress plate so as to facilitate engagement of the locator projection with the contact point during rotation of the composite stress plate along with the fastener and to prevent further relative rotation between said composite stress plate and the barrel assembly when the fastener is threaded into the plastic insert, said peripheral rib of said plate retaining member engaging said rim of said metal plate when said barrel assembly is pressed onto said composite stress plate.

2. The combination of claim 1, including three locator projections equally spaced about a central axis of said barrel assembly and extending downwardly from an engagement face of said plate retaining member.

3. The combination of claim 2 wherein said locator projections comprise three metal studs extending downwardly from said engagement face.

4. The combination of claim 1 including a hub on said plastic insert which is congruent with said aperture.

5. The combination of claim 4 wherein said hub engages the concentric aperture and has at least one tab depending therefrom, the free end of said tab defining a bearing edge spaced away from the hub and directed upward to engage the bottom surface of the cup in the metal plate, thereby fixing the hub in engagement with the aperture.

6. The combination of claim 1 wherein said recess includes a depressed ramp which extends from the plate downward in a counterclockwise fashion.

7. The combination of claim 6 wherein said ramp includes a cleat depending from a lower edge of said ramp for engaging the insulation.

8. The combination of claim 1 wherein said means for preventing relative rotation includes a crimp in the metal plate extending radially into said cup and engaging the plastic insert.

9. The combination of claim 1 wherein said means for preventing relative rotation includes a stake positioned at an upper lip of the cup, the plastic insert captured between said stake and a lower lip of the cup.

10. The combination of claim 8 wherein said crimp is placed in a central portion of said cup.

11. The combination of claim 8 wherein said crimp is placed at a lower lip of the cup, a portion of said plastic insert extending below said lower lip.

12. The combination of claim 1 wherein said plastic insert and said cup are substantially congruent in a shape which prevents relative rotation between the plastic insert and the metal plate.

13. In combination, a composite stress plate for securing a layer of insulation to a roof deck with a threaded fastener, and a barrel assembly for an installation tool operating to rotate said fastener by threading it into the composite stress plate, said barrel assembly having a plate retaining member on a distal end thereof, comprising:

a metal plate having a drawn central cup with a concentric aperture, said plate having an elevated portion and a rim, said rim coplanar with a bearing flat within said central cup in a plane parallel to and below the elevated portion;

a plastic insert having a central throughbore completely therethrough for receiving the fastener therethrough in an interference-fit relationship, said insert adapted to engage the cup in the metal plate and forming the composite stress plate therewith;

said plate retaining member having an engagement face with at least one locator projection extending downwardly therefrom, and a peripheral rib;

means for preventing relative rotation between the plastic insert and the metal plate; and at least one depressed ramp provided in the elevated portion of said plate for receiving the locator projection, said ramp extending from the elevated portion downward in a counterclockwise fashion and terminating in a contact point, with a lower edge of said ramp having a depending cleat for engaging the insulation, said cleat extending below the plane of the bearing flat and the rim;

said locator projection being received by said depressed ramp as said barrel assembly is pressed down onto said composite stress plate so as to facilitate engagement of the locator projection with the contact point during rotation of the composite stress plate along with the fastener and to prevent further relative rotation between the composite stress plate and the barrel assembly when the fastener is threaded into the plastic insert, said peripheral rib of said plate retaining member engaging said rim of said metal plate when said barrel assembly is pressed onto said composite stress plate.

14. The combination of claim 13 including three depressed ramps and three locator projections.

15. The combination of claim 13 wherein said locator projection comprises at least one metal stud.

16. The combination of claim 13 wherein said cup has an upper concave portion and a lower cylindrical portion with said bearing flat located between said upper and lower portions.

17. The combination of claim 16 wherein said insert is received by the lower portion of said cup.

18. The combination of claim 13 wherein said means to prevent relative rotation includes a crimp in the metal plate extending radially into said cup and engaging the plastic insert.

19. The combination of claim 16 wherein an inner diameter of said lower cylindrical portion of the cup is smaller than an outer diameter of a head of said fastener so that said fastener head engages the bearing flat when it is threaded into said roof deck.

20. In combination, a composite stress plate for securing a layer of insulation to a roof deck with a threaded fastener, and a barrel assembly for an installation tool operating to rotate said fastener by threading it into the composite stress plate, and a barrel assembly for an installation tool, said barrel assembly having a plate retaining member on a distal end thereof, comprising:

a metal plate having a drawn central cup with a concentric aperture, said cup having a concave upper portion and a cylindrical lower portion, said plate having an elevated portion and a rim, said rim coplanar with a bearing flat within said central cup between said upper portion and said lower portion and in a plane parallel to and below the elevated portion of said plate;

a plastic insert having a central throughbore completely therethrough for receiving the fastener therethrough in an interference-fit relationship, said insert being received by and corresponding in shape to the lower cylindrical portion of said cup and forming with said metal plate said composite stress plate;

said plate retaining member having an engagement face with a peripheral rib, said engagement face having at least two metal studs extending downwardly therefrom and equally spaced about a central axis of said barrel assembly;

a crimp in said metal plate extending radially into the lower portion of said cup to retain said plastic insert therein and to prevent relative rotation between the plastic insert and the metal plate; and at least two depressed ramps in the elevated portion of said plate for receiving the metal studs on said barrel assembly, each of said ramps extending from the elevated portion downward in a counterclockwise fashion and terminating in a contact point, with a lower edge of each ramp having a depending cleat for engaging the insulation;

said studs being received in said depressed ramps as said barrel assembly is pressed down onto said composite stress plate so as to facilitate engagement of the studs with the contact points during rotation of the composite stress plate along with the fastener and to thereafter hold the composite stress plate against further rotation, with the peripheral rib on said plate retaining member engaging the rim on said composite stress plate to align said stress plate with said fastener while the installation tool threads the fastener through the plastic insert.

* * * * *